United States Patent
Balasubramanian et al.

(10) Patent No.: US 10,277,662 B2
(45) Date of Patent: Apr. 30, 2019

(54) PHOTO REQUEST USING A LOCATION IDENTIFIER

(71) Applicant: INTERNATIONAL BUSINESS MACHINES CORPORATION, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 15/153,072

(22) Filed: May 12, 2016

(65) Prior Publication Data

US 2017/0331877 A1    Nov. 16, 2017

(51) Int. Cl.
*H04L 29/06* (2006.01)
*H04L 29/08* (2006.01)

(52) U.S. Cl.
CPC .............. *H04L 67/06* (2013.01); *H04L 67/18* (2013.01); *H04L 67/32* (2013.01)

(58) Field of Classification Search
CPC ........................................................ H04L 67/06
USPC ........................................................ 709/204
See application file for complete search history.

(56) References Cited

U.S. PATENT DOCUMENTS

| | | |
|---|---|---|
| 7,372,482 B2 | 5/2008 | Smith |
| 8,594,702 B2 | 11/2013 | Naaman et al. |
| 8,675,987 B2 | 3/2014 | Agarwala et al. |
| 2008/0306995 A1 | 12/2008 | Newell et al. |
| 2009/0016565 A1 | 1/2009 | Kulumani |
| 2009/0046934 A1 | 2/2009 | Beato et al. |
| 2011/0055045 A1 | 3/2011 | Smith et al. |
| 2011/0099199 A1 | 4/2011 | Stalenhoef et al. |
| 2015/0244878 A1 | 8/2015 | Macauley et al. |

OTHER PUBLICATIONS

Tang et al., "Fast Near Duplicate Detection for Personal Image Collections." Proceedings of the 17th ACM International Conference on Multimedia. ACM, 2009
Tesic, "Metadata Practices for Consumer Photos." MultiMedia, IEEE 12.3 (2005): 86-92.

*Primary Examiner* — Adnan M Mirza
(74) *Attorney, Agent, or Firm* — Intelletek Law Group, PLLC; Gabriel Daniel, Esq.

(57) ABSTRACT

A method and system of fulfilling a request for a desired photo. A request from a first service subscriber for a desired photo in a first data packet is received. Upon determining that the photo capturing device has the location compatibility and the hardware compatibility to fulfill the request for the desired photo, a fulfillment request is sent in a second data packet to the photo capturing device. Upon receiving a response photo from the photo capturing device, it is determined whether the response photo accommodates the desired photo. Upon determining that the response photo accommodates the desired photo, the response photo is sent to the first service subscriber.

18 Claims, 4 Drawing Sheets

PHOTO REQUEST USING A LOCATION IDENTIFIER

BACKGROUND

Technical Field

The present disclosure generally relates to digital photography, and more particularly, to providing metadata for a desired photo.

Description of the Related Art

In recent years, photography has seen a significant transformation from film to digital photography. Digital photography has ushered in the ability to provide an electronic description of a photo file. To that end, metadata associated with a photo file may include various information that characterizes a photo. Such information may include who created the photo file, a camera model, date, geolocation, and other camera settings.

One popular format for metadata is provided by the Exchangeable Photo File Format (EXIF), which provides a standard for storing administrative metadata in digital photo files during acquisition, such as lens aperture, focal length, camera shutter speed, ISO speed, exposure time, exposure bias, focal length, maximum aperture, metering mode, subject distance, flash mode, flash energy, contrast, brightness, light source, exposure, saturation, sharpness, white balance, etc. While certain metadata entries may be generated automatically by the camera, additional metadata may be entered by an operator either before taking a photo or during a post processing step, to provide additional context for the photo. It is with respect to these considerations and others that the present disclosure has been written.

SUMMARY

According to an embodiment of the present disclosure, a computing device has a fulfillment engine application, wherein execution of the fulfillment engine application configures the computing device to perform various acts. A request is received from a first service subscriber for a first desired photo. This request is in the form of a first data packet. It is determined whether a photo a photo capturing device has a location compatibility for the desired photo. It is also determined whether the photo capturing device has a hardware compatibility for the desired photo. Upon determining that the photo capturing device has the location compatibility and the hardware compatibility, a fulfillment request is sent in a second data packet to the photo capturing device. Upon receiving a response photo from the photo capturing device, it is determined whether the response photo accommodates the desired photo. Upon determining that the response photo accommodates the desired photo, the response photo is sent to the first service subscriber. However, upon determining that the response photo does not accommodate the desired photo, the computing device returns to finding a compatible photo capturing device.

According to another embodiment of the present disclosure, a non-transitory computer readable storage medium tangibly embodying a computer readable program code having computer readable instructions which, when executed, causes a computer device to carry out the steps of a method for fulfilling a request for a photo. In the method, a request is received from a first service subscriber for a first desired photo. This request is in the form of a first data packet. It is determined whether a photo a photo capturing device has a location compatibility for the desired photo. It is also determined whether the photo capturing device has a hardware compatibility for the desired photo. Upon determining that the photo capturing device has the location compatibility and the hardware compatibility, a fulfillment request is sent in a second data packet to the photo capturing device. Upon receiving a response photo from the photo capturing device, it is determined whether the response photo accommodates the desired photo. Upon determining that the response photo accommodates the desired photo, the response photo is sent to the first service subscriber. However, upon determining that the response photo does not accommodate the desired photo, the method returns to finding a compatible photo capturing device.

According to another embodiment of the present disclosure, there is a method for fulfilling an electronic request for a photo. In the method, a request is received from a first service subscriber for a first desired photo. This request is in the form of a first data packet. It is determined whether a photo a photo capturing device has a location compatibility for the desired photo. It is also determined whether the photo capturing device has a hardware compatibility for the desired photo. Upon determining that the photo capturing device has the location compatibility and the hardware compatibility, a fulfillment request is sent in a second data packet to the photo capturing device. Upon receiving a response photo from the photo capturing device, it is determined whether the response photo accommodates the desired photo. Upon determining that the response photo accommodates the desired photo, the response photo is sent to the first service subscriber. However, upon determining that the response photo does not accommodate the desired photo, the computing device returns to finding a compatible photo capturing device.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to digital photography, and more particularly, to providing parameters in the form of metadata for a desired photo. An operator of a photo capturing device may want to capture a photo of a subject. For various reasons, the user may decide that the photo cannot be taken with a desired composition. As used herein, the term "composition" refers to the settings of the camera, which may be captured by metadata, such as f-stop, aperture setting, etc., as well as the lighting conditions (e.g., day, night, weather conditions, etc.) and visual elements in the photo. To that end, the user has an option to crowdsource the fulfilment of the desired photo. Put differently, the contribution from a large group of subscribers may be used to source a photo that meets the parameters specified by a requestor.

To that end, a central server is configured to identify one or more alternate photo capturing devices that may be qualified to fulfil a request for the desired photo, based on the metadata and other possible supplemental information provided by the requestor. In one embodiment, the request may be generated on a first photo capturing device. By virtue of crowdsourcing the request for the desired photo, the efforts of several volunteers who subscribe to the service may be used to fulfill the request for the desired photo.

Reference now is made in detail to the examples illustrated in the accompanying drawings and discussed below.

Example Architecture

Figure 1:
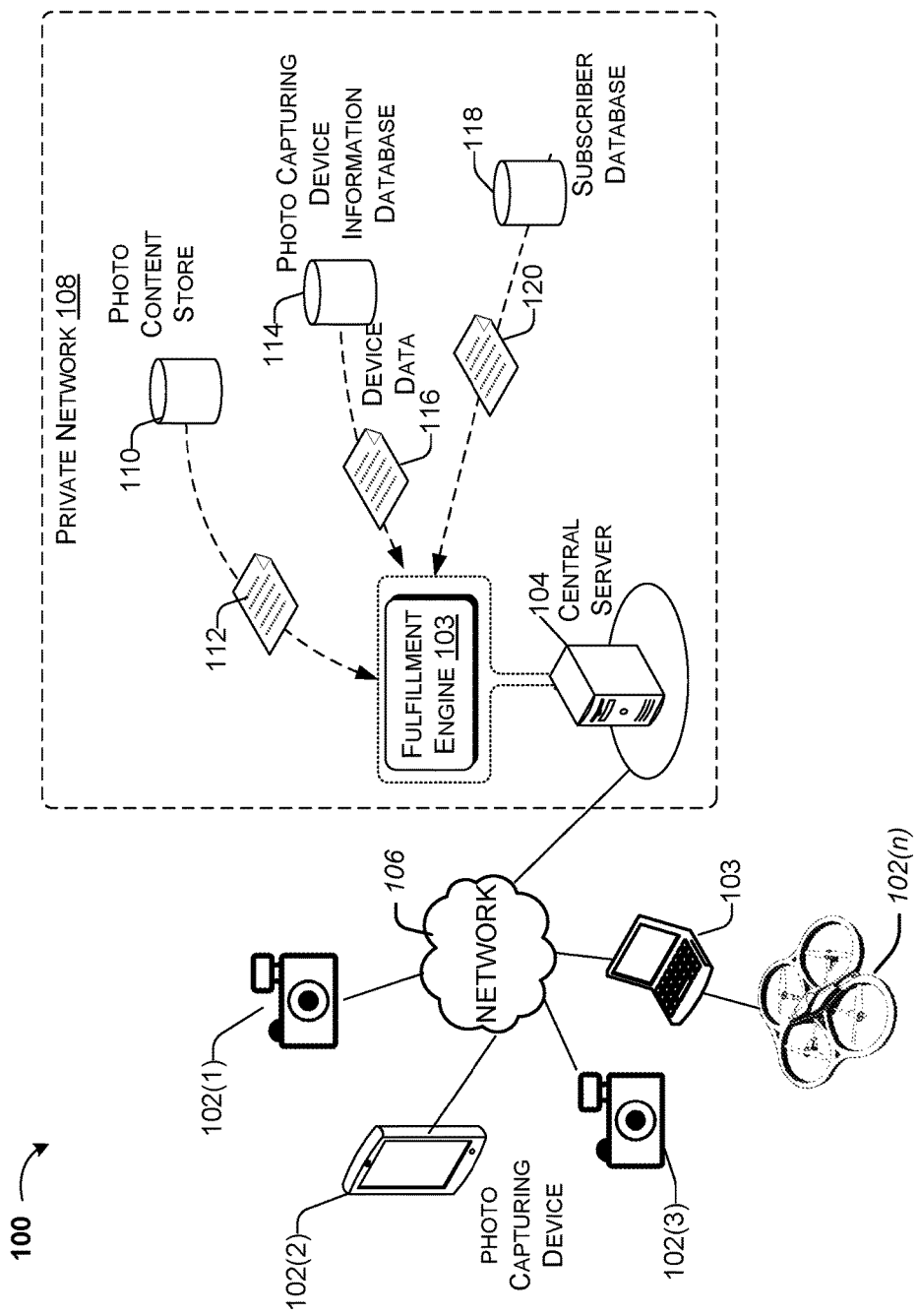
FIG. 1 illustrates an example architecture for implementing a photo fulfillment system.

FIG. 1 illustrates an example architecture 100 for implementing a photo fulfillment system. Architecture 100 includes a network 106 that allows various photo capturing devices 102(1) to 102(n) to communicate with each other as well as any other components that are connected to the network 106. Today, portable photo capturing devices (IDC's) typically take the form of compact cameras, digital single lens reflex cameras (DSLRs), mirrorless cameras, and hybrid cameras, although they may be implemented in other form factors, including portable handsets, smart-phones, tablet computers, personal digital assistants (PDAs), smart watches, and camera equipped drones.

The network 106 may be, without limitation, a local area network ("LAN"), a virtual private network ("VPN"), a cellular network, or the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. Network 106 allows users of the photo capturing devices that are subscribed to a private network 108 to send information to and receive information from a private network 108. In some embodiments, the photo capturing device, such as photo capturing device 102(n), is not directly connected to the network 106; rather, it may use an intermediary computing device 103 to provide the necessary functionality to communicate over the network 106.

The private network 108 includes a fulfillment engine 103 (e.g., a program) that is executed on a central server 104. The central server 104 may include general purpose computers, such as desktop computers, tablet computers, laptop computers, servers, or other electronic devices that are capable of receiving data packages, processing the data packages, and generating output data. In other embodiments, the central server 104 represents virtual computing devices in the form of virtual machines or software containers that are hosted in a cloud. Accordingly, while a single central server 104 is illustrated, it will be understood that the functions of the central server 104 may be implemented in a distributed fashion on a number of similar platforms, to distribute the processing load.

The fulfillment engine 103 is configured to receive digital data packets from various photo capturing devices 102(1) to 102(n) or other computing, such as a photo content store 110, a photo capturing device information database 114, a subscriber database 118, etc. For example, a data packet may include: (i) a request for a picture of a subject and (ii) predefined metadata. In one embodiment, the data packet may additionally include supplemental information that further defines the composition of a desired picture.

The fulfillment engine 103 is also configured to determine one or more appropriate photo capturing devices (e.g., 102(1) to 102(n)) that could fulfill the request for the picture. To that end, the fulfillment engine 103 may access data 120 from subscriber database 118 to determine what photo capturing devices are subscribed to its service.

In one embodiment, the fulfillment engine 103 is configured to receive device data 116 from photo capturing device information database 114 that is populated with available parameters for a variety of popular digital cameras. Accordingly, the device data 116 of the photo capturing device information database helps determine whether an available photo capturing device is capable of fulfilling a request for the photo of a subject.

In one embodiment, the fulfillment engine 103 is configured to receive photos 112 from a photo content store 110. For example, the photo content store 110 may provide photos that may fulfill the request for the photo of a subject by providing a stored photo 112.

The photo content store 110, photo capturing device information database 114, subscriber database 118, and central server 104 can be stand-alone servers or combined on a single server or hosted in a cloud.

Example Photo Capturing Device

Figure 2:
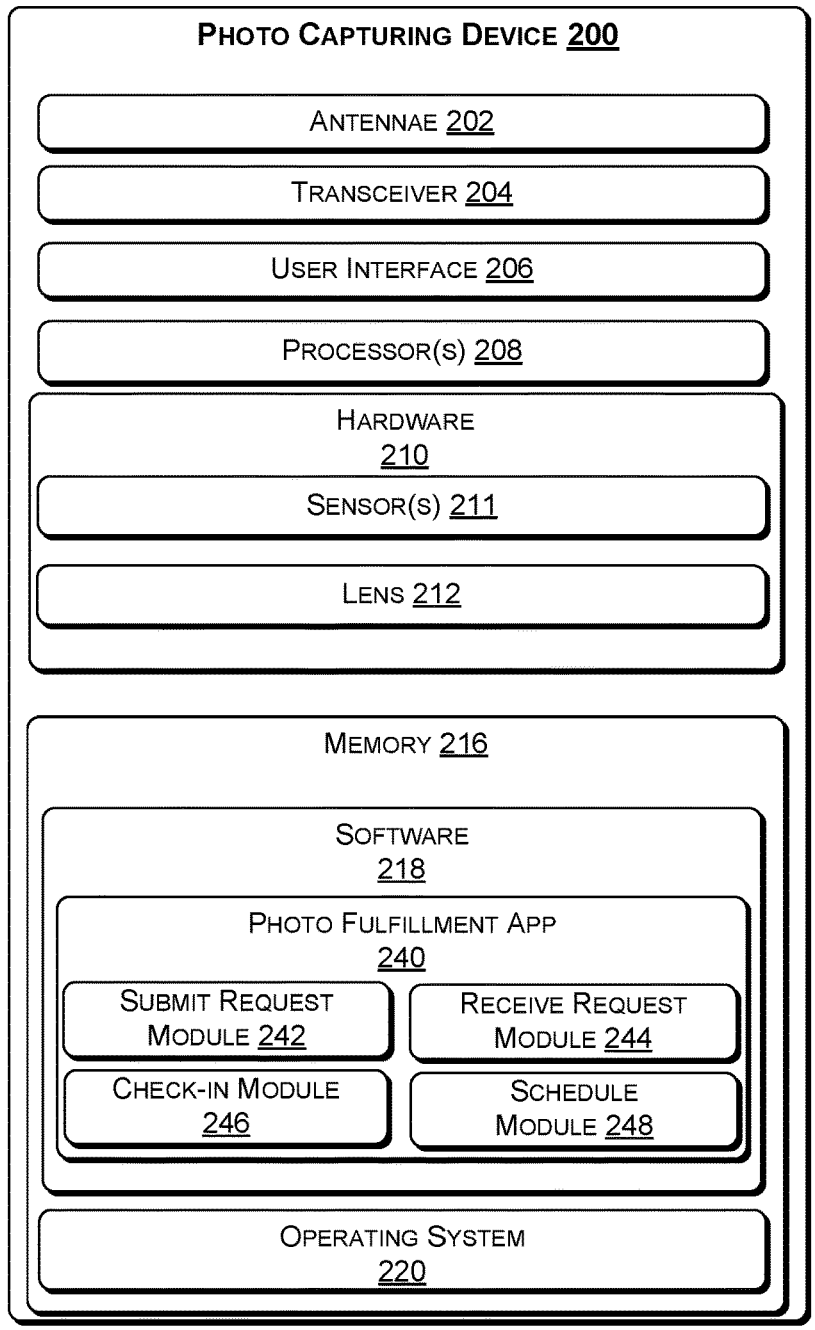
FIG. 2 illustrates a block diagram showing various components of an illustrative photo capturing device at a high level, consistent with an exemplary embodiment.

As discussed in the context of FIG. 1, the photo fulfillment system 100 involves several photo capturing devices. To that end, FIG. 2 illustrates a block diagram showing various components of an illustrative photo capturing device 200 at a high level. It will be understood that the photo capturing device 200 may be a stand-alone photo capturing device, such as a digital camera, or may be incorporated into another device, such as a personal digital assistant (PDA), a tablet computer, or the like. For discussion purposes, the illustration shows the photo capturing device 200 in the form of a handheld smart-phone.

The photo capturing device 200 may include one or more antennae 202, a transceiver 204 for cellular and/or Wi-Fi communication, user interface 206, one or more processors 208, hardware 210, and memory 216. In some embodiments, the antennae 202 may include an uplink antenna that sends radio signals to a base station, and a downlink antenna that receives radio signals from the base station. In other embodiments, a single antenna may both send and receive radio signals. The same or other antennas may be used for Wi-Fi communication. These signals may be processed by the transceiver 204, sometimes collectively referred to as a network interface, which is configured to receive and transmit digital data.

In one embodiment, the photo capturing device 200 includes a user interface 206 that enables a user to provide input and receive output from the photo capturing device 200. For example, the user interface 206 may include a data output device (e.g., visual display, audio speakers, haptic device, etc.,) that may be used to display notifications from the fulfillment engine 103 of the central server 104. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces. In various embodiments, the data input devices may be used to enter and/or modify metadata and to provide supplemental information for a desired photo.

The photo capturing device 200 may include one or more processors 208, which may be a single-core processor, a multi-core processor, a complex instruction set computing (CISC) processor, or another type of processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may further include hardware decoders and encoders, a network interface controller, and/or a universal serial bus (USB) controller.

The hardware 210 may also include various sensors 211, such as one or more sensors of light, photo, vibration, etc. The sensors 211 may include a global positioning system (GPS) sensor which may, in some embodiments, provide information on the geolocation from where a photo is taken.

The hardware 210 may also include one or more lenses 212 that are operable to take a photo of a subject. In various scenarios, this photo taken by the lens 212 may be (i) provided to the fulfillment engine 103 of the central server 104 as a starter photo to be routed to the photo capturing device that may fulfill the request for the photo, or (ii) it may be a photo that is taken by a photo capturing device in fulfillment of a request.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components or modules that are executable or accessible by the processor(s) 208 and controller(s) of the photo capturing device 200. The various components of the memory 216 may include software 218 and an operating system 220. Each module may include routines, program instructions, objects, and/or data structures that perform particular tasks or implement particular abstract data types.

For example, the software 218 of the memory 216 may include a photo fulfillment application (app) 240 that is operative to perform various functions, including functions of requesting and/or receiving a request for a photo of a subject. To that end, the photo fulfillment app 240 may have a submit request module 242 that may be used by the operator of the photo capturing device 200 to place a request for a desired photo of a subject with predetermined metadata.

In one embodiment, there is a receive request module 244 to receive requests from other subscribers of the photo fulfillment service discussed herein. For example, by selecting the receive request module 244, the operator of the photo capturing device 200 may learn of requests that could be fulfilled using the photo capturing device 200.

In various embodiments, the photo fulfillment app 240 may provide the geolocation of the photo capturing device 200 at predetermined intervals, upon request from a central server, or as part of an anticipatory plan (e.g., scheduled route), part of a data packet to request a photo, or push notification in the context of an electronic "check-in." For example, an operator of the photo capturing device 200 may click on the check-in module 246 to indicate to the central server 104 the present geolocation of the photo capturing device 200 and that the operator is available to provide a photo upon request. This information may be stored by the central server 104 in the subscriber database 118.

In one embodiment, there is a schedule module 248, where an operator of the photo capturing device 200 may provide the fulfilment engine 102 an anticipatory schedule (e.g., scheduled route) of the location(s) (e.g., waypoints) that the photo capturing device 200 will be at, such that the fulfillment engine 103 can better match a photo capturing device with a potential photo request.

The operating system 220 may include components that enable the photo capturing device 200 to receive and transmit data via various interfaces (e.g., user controls, communication interface, and/or memory input/output devices), as well as process data using the processors 208 to generate output. The operating system 220 may include a presentation component that presents the output (e.g., display the data on an electronic display of the photo capturing device 200, store the data in memory 216, transmit the data to another electronic device, etc.). Additionally, the operating system 220 may include other components that perform various additional functions generally associated with an operating system 220.

Example Scenario

Figure 3:
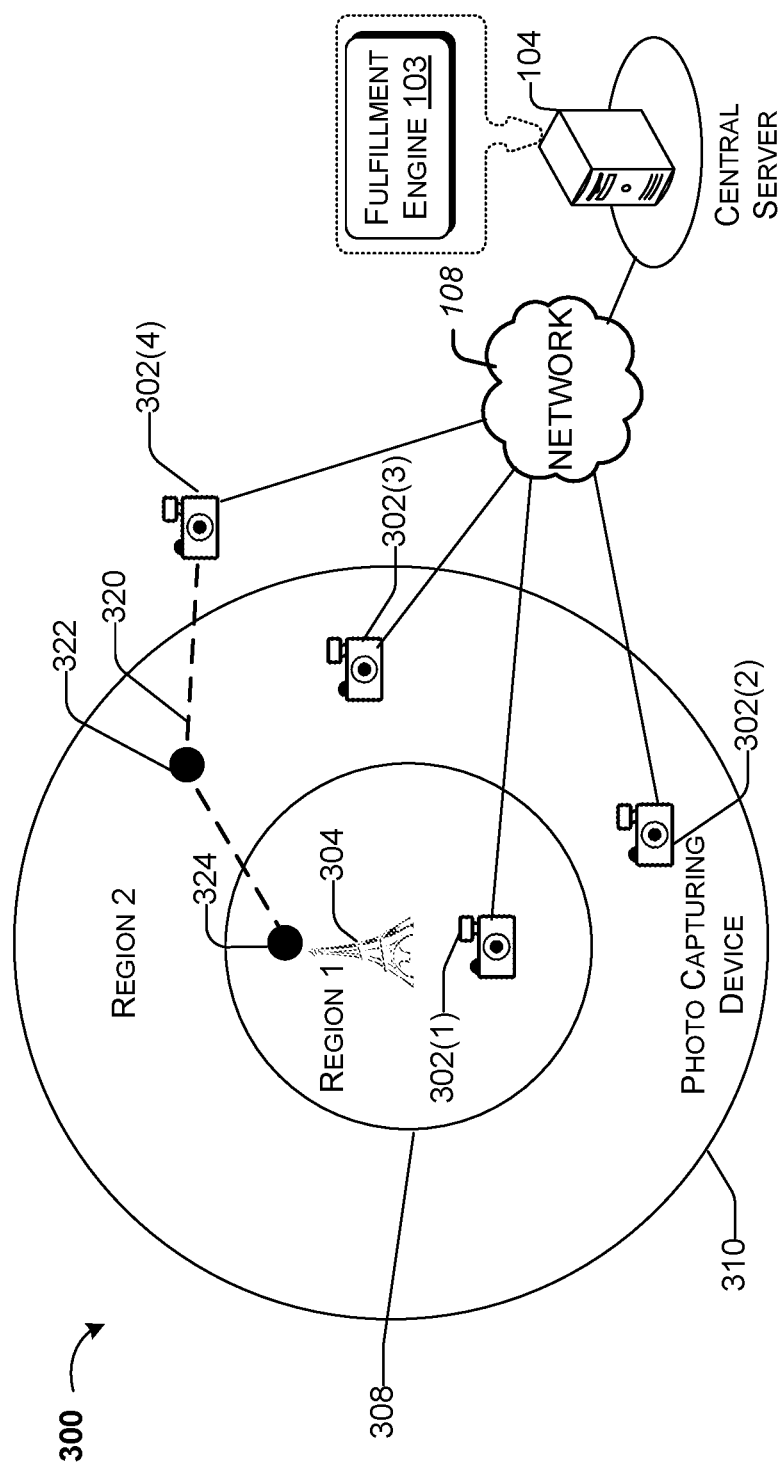
FIG. 3 illustrates a high level operation of the fulfillment system, consistent with an exemplary embodiment.

With the foregoing overview of the architecture 100 and components of photo capturing device 200, it may be helpful to provide an illustrative example. To that end, FIG. 3 illustrates a high level operation of the fulfillment system, consistent with an exemplary embodiment. By way of example, system 300 illustrates a subject 304 (e.g., the Eifel Tower) in a first region 308, which is meant to be captured by a first photo capturing device 302(1). There are second and third photo capturing devices 302(2) and 302(3) that are in a second region 310, and a fourth photo capturing device 302(4) that is outside both the first area and the second area.

For various reasons, the operator of the first photo capturing device 302(1) may decide that conditions are not optimal for taking a picture of the subject 304. For example, there may be adverse weather conditions (e.g., cloudy, windy, rainy, etc.), the time of the day may not be optimal (e.g., day vs. night), the correct equipment may not be available (e.g., a flash may not be available or the lens is not have the requisite f-stop or telephoto capability), the photo should be taken from a higher altitude (e.g., from a drone), and the like. To that end, the operator of the first photo capturing device 302(1) may use the photo fulfillment app 240 that is stored in the memory of the first photo capturing device 302(1) to create a data packet to be sent to the central server to request the desired photo of the subject 304. The data packet may include a combination of: (i) a starter photo, (ii) a geolocation, (iii) metadata, (iv) supplemental information, and/or (v) a time window of when the photo should be provided to the central server, and by extension, the requestor.

In one embodiment, the first photo capturing device 302(1) may be used to capture a starter photo of the subject 304 to provide a general reference of the subject matter and the composition desired. Since the conditions under which the starter photo was taken may not be optimal, it will be understood that the starter photo merely provides a general understanding of the subject matter and indicia of the desired composition. In some embodiments, a starter photo is not necessary.

The operator of the first photo capturing device 302(1) may create metadata to describe the composition of the desired photo. For example, the operator may provide, without limitation, one or more of the following parameters in the context of metadata: type of camera, date, lens aperture, focal length, camera shutter speed, ISO speed, exposure time, exposure bias, focal length, maximum aperture, metering mode, subject distance, flash mode, flash energy, contrast, brightness, light source, exposure, saturation, sharpness, white balance, etc. The operator may further provide a geolocation of the point from which to take the photo of the subject 304. The geolocation may also include a desired elevation for the photo. In various embodiments, the geolocation of the first photo capturing device 302(1) (and/or other photo capturing devices 302(2) and 302(3)) may be provided by GPS sensor of the photo capturing device 302(1), via cellular multilateration, or via cellular triangulation.

Cellular multilateration is a technique based on measuring the difference in distance in which two known cell towers locations receive a signal from the transceiver of the photo capturing device at an unknown location. There are an endless number of potential locations based on distance measurements alone, but when the points are plotted together, they form a hyperbolic curve. To determine where a photo capturing device lies along the curve, measurements are taken again, but this time with a different set of cellular towers. The second hyperbolic curve produced should intercept the first curve at certain points, producing a small number of possible locations for the missing phone. Multilateration executed in urban areas, where cell towers are abundant, is more likely to produce a more precise result, whereas multilateration carried out in rural areas, where cell towers are miles away from each other, will result in a significantly less precise reading.

Cellular triangulation also uses cell towers to track the location of the photo capturing device, but instead of measuring distances, triangulation measures the angles to the device from the ends of a baseline (in this case, the two cell towers act as the "ends", and the baseline is the line connecting the two cell towers). When the angles are known, two lines from each tower can be drawn out at the specified angles until the lines cross, forming a triangle. The point at which the lines cross represents the approximate location of the device. Accordingly, triangulation is faster than multilateration since only one set of measurements is used instead of two, and only two cell towers are used instead of four.

In one embodiment, the operator of the first photo capturing device 302(1) may use the metadata generated by the starter photo as a seed. The operator can then adjust the metadata in the request for the desired photo.

In one embodiment, the operator of the first photo capturing device 302(1) provides supplemental information that further defines the composition of a desired picture. Supplemental information may include, without limitation, a name of the subject 304 (e.g., Eifel Tower), a preferred position, type of filter to include, etc.

Accordingly, the photo fulfillment app may send a request for a photo in the form of a data packet comprising at least one of (i) a starter photo, (ii) a geolocation, (iii) metadata, (iv) supplemental information, and (v) a time window of when the photo should be provided to the fulfilment engine 102 of the central server 104. In turn, the fulfilment engine 102 attempts to route the request for a desired photo to another photo capturing device that that can fulfill the request. In various embodiments, compatibility can be determined in different ways, including location (e.g., proximity to the identified geolocation) and hardware of the available photo capturing device.

For example, the fulfillment engine 103 may identify all the photo capturing devices (that are subscribed to the present photo fulfillment service) that are in the first region 308, using the geolocation techniques discussed herein. The first region 308 may represent a small region and/or diameter from which the photo should be taken. Put differently, it is a region that may be within walking distance of the geolocation specified in the data packet from the first photo capturing device 302(1). In one embodiment, the subject 304 need not be in the first region 308. That is because the first region is based on the geolocation from which the photo should be taken and not the subject of the photo.

In the example of FIG. 3, the first area may be the Champ de Mars, with the subject 304 being the Eiffel Tower, while the second region 310 may represent a larger area and/or diameter from the specified geolocation, such as a county, town, or city (e.g., Paris). Accordingly, subscribed operators of photo capturing devices that are in the second region 310 but outside the first region 308 may travel, (e.g., drive, take public transportation, etc.) to reach the specified geolocation.

In one embodiment, if photo capturing devices that subscribe to the photo fulfillment service are not available in the first region 308, then the search is expanded to the second region 310. For example, the fulfillment engine 103 may determine from a subscriber database 118, what photo capturing devices are available in the first region 308 and/or the second region 310 based on the geolocation techniques discussed herein. In the example of FIG. 3, it is assumed that photo capturing devices 302(2) and 302(3) are in the second region during the specified time window.

The fulfilment engine 102 may also determine whether a photo capturing device has the compatible hardware to fulfill the request for the photo requested in the first data packet. In this regard, the fulfillment engine 103 may refer to the photo capturing device information database 114 to retrieve therefrom the device data of candidate photo capturing devices that are in the first region 308 and/or the second region 310 for the time window specified. For example, the data packet of the request for a photo from the first photo capturing device 302(1) may specify a lens type, an f-stop, aperture setting, and/or shutter setting that may not be compatible with the second photo capturing device 302(2) but is compatible with the third photo capturing device 302(3). In this regard, the fulfillment engine 103 sends a request to fulfill the request for the desired photo to the third photo capturing device 302(3) (i.e., instead of the second photo capturing device 302(2)). In one embodiment, the fulfillment request is sent to all compatible photo capturing devices that are in the first region 308 and/or the second region 310.

In one embodiment, a photo capturing device may still be a candidate to fulfill a request for a photo even though they are presently outside the second region 310. As mentioned previously, a photo capturing device, such as 302(4) may provide a scheduled route 320 and/or one or more anticipated waypoints (e.g., waypoints 322 and 324) via a schedule module 248 that is stored in the subscriber database 118. Accordingly, if the schedule indicates that a photo capturing device (e.g., 302(4)) is anticipated to be in the first region 308 within the specified time window, then a request for fulfillment may be sent to the photo capturing device 302(4).

There may be scenarios where none of the photo capturing devices that are in (or are anticipated to be in) the first region 308 and/or the second region 310 are compatible with the parameters specified in the request for photo data packet. To that end, in one embodiment, the fulfilment engine 102 of the central server 104 may alter the metadata provided in the data packet of the request for the desired photo, to accommodate one or more photo capturing devices that are in the first region 308 and/or second region 310. For example, if the second photo capturing device 303(2) meets many or most of the requirements specified in the request for photo data packet, but cannot accommodate an f-stop requirement of 1.2 (e.g., because it is limited to an f-1.4), then the metadata may be changed to an f-1.4 for the photo capturing device 303(2). In one embodiment, if a photo is subsequently received from the second photo capturing device 303(2) (e.g., with the amended f-stop), then the response data package that includes the fulfillment photo may include an indication that a different f-stop was used.

In one embodiment, if none of the photo capturing devices are deemed to qualify to fulfill the request for the photo from the first photo capturing device 302(1), then the fulfillment engine 103 determines whether the photo content store 110 has a previously stored compatible photo. If so, the photo 112 is sent to the appropriate recipient.

Example Processes

Figure 4:
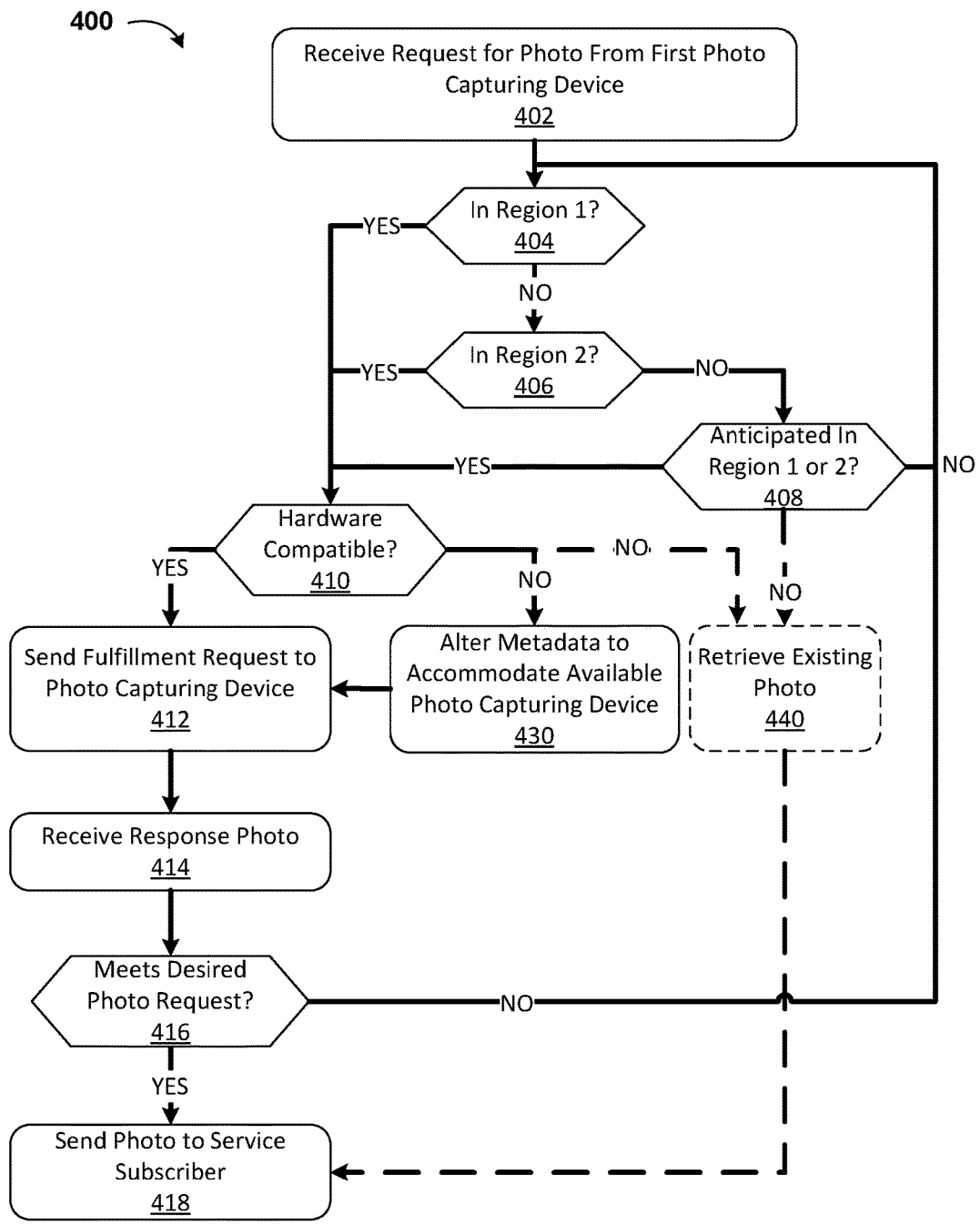
FIG. 4 presents an illustrative process for fulfilling a request for a photo.

It may be helpful now to consider a high-level discussion of an example process. To that end, FIG. 4 presents an illustrative process 400 for fulfilling a request for a photo. Process 400 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1 and some components of FIG. 3.

At block 402, the fulfillment engine 103 of the central server 104 receives a request from a first service subscriber for a first desired photo. This request is received in the form of a data packet comprising (i) a geolocation from where the desired photo is to be taken, (ii) metadata for the first desired photo, and (iii) a time window of when the photo is to be provided to the central server. In various embodiments, additional information may be provided in the first data packet, including, for example, (i) a starter photo and (ii) supplemental information that further defines the composition of the desired photo.

At blocks 404 and 406, the central server determines the location compatibility of subscribed photo capturing devices. For example, at block 404, the fulfillment engine 103 of the central server 104 determines whether a subscribed photo capturing device is available in the first region (e.g., 308 of FIG. 3). If not (i.e., "NO" at decision block 404), the process continues with block 406, where a determination is made whether a subscribed photo capturing device is available in the second region (e.g., 310 of FIG. 3).

In one embodiment, upon determining that a subscribed photo capturing device is not available in the first and second regions, at block 408, a determination is made whether a photo capturing device is scheduled to be in the first and/or second region. For example, a subscriber to the photo fulfillment service described herein may have provided a scheduled route or anticipated waypoints via their photo fulfillment app. The fulfillment engine 103 of the central server 104 may retrieve this scheduling information from the subscriber database 118 to determine whether the photo capturing device will be in the first and/or second region. If not (i.e., "NO" at decision block 408), then the process returns to block 404.

However, upon determining that a photo capturing device is available in the first and/or second region, or is anticipated to be in the first and/or second region (i.e., "YES at blocks 404, 406, or 408), then the process continues with block 410, where the fulfillment engine 103 of the central server 104 determines whether the one or more photo capturing devices have hardware that is compatible for the desired photo. As discussed previously, the requestor of the desired photo may have provided metadata and possible additional supplemental information that may limit what photo capturing devices would qualify to take the desired photo. For example, a particular shutter speed, flash requirement, f-stop, etc., may be specified in the metadata that may not be compatible with one or more available photo capturing devices.

Upon determining that a photo capturing device has the hardware compatibility (i.e., "YES" at block 410), the process continues with block 412 where the fulfillment request is sent to the compatible photo capturing device. In various embodiments, the request may be sent to (i) all available and hardware compatible photo capturing devices, (ii) to the one with the most closely matching specifications, or (iii) the one that is closest to the specified geolocation from where the photo is to be taken.

In one embodiment, upon determining that a photo capturing device is available but the hardware is not compatible (i.e., "NO" at decision block 410), the process continues with block 430 where the fulfillment engine 103 of the central server 104 alters the metadata to accommodate the available photo capturing device(s). Put differently, the fulfillment engine 103 makes changes to the metadata to accommodate the limitations of the available photo capturing device(s).

At block 414, the fulfillment engine 103 receives a response data packet that includes the response photo from the commissioned one or more photo capturing devices. In one embodiment, the response data packet may further include a geolocation from where the photo was taken, metadata, supplemental information, etc., of the response photo.

At block 416, the fulfillment engine 103 determines whether the response photo accommodates the desired photo. To that end, the fulfillment engine 103 may determine whether the metadata and the geolocation in the response data packet substantially correlates with the request data packet. In one embodiment, if the metadata was altered by the fulfillment engine 103, a correlation is performed with the altered metadata. If there is no sufficient correlation (i.e., "NO" at decision block 416), then the process returns to block 404.

Upon determining that there is sufficient correlation (i.e., "YES" at decision block 416), then the process continues with block 418, where the response data packet comprising the photo, geolocation, and the metadata is sent to the requestor of the desired photo as a fulfillment data packet. The fulfillment engine 103 of the central server 104 may include ancillary information, such as how closely the metadata correlates with the requested photo. In one embodiment, the identity of the subscriber who fulfilled the request for the desired photo is not revealed.

In various embodiments, the actual destination may be determined from the profile of the subscriber that is available in the subscriber database 118, or can be provided directly in the first data packet. The fulfillment data packet may be sent to the recipient in various ways, such as common short code (CSC) using a short message service (SMS), multimedia message service (MMS), e-mail, social media, etc.

In some embodiments, upon determining that a photo capturing device will not be in the first region and/or the second region 2 (i.e., "NO" at decision block 408), or there are no hardware compatible photo capturing devices in region 1 and/or region 2 (i.e., "NO" at decision block 410), then the process continues with block 440, where the fulfillment engine 103 retrieves an appropriate photo 112 from the photo content store 110. The photo is then sent to the requestor as a fulfillment data packet (i.e., block 418).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
    a processor;
    a network interface coupled to the processor;
    a storage device for content and programming coupled to the processor;
    a fulfillment engine application stored in the storage device, wherein an execution of the fulfillment engine application by the processor configures the computing device to perform acts comprising:
    receiving a request, in a first data packet from a photo capturing device of a first service subscriber, the data packet comprising a starter photo of a subject of a desired photo;
    determining whether a second photo capturing device has a location compatibility for the desired photo;
    determining whether the second photo capturing device has a hardware compatibility for the desired photo;
    upon determining that the second photo capturing device has the location compatibility and the hardware compatibility:
        sending a fulfillment request in a second data packet comprising the starter photo to the second photo capturing device;
    upon receiving a response photo from the second photo capturing device:
        determining whether the response photo accommodates the desired photo;
        upon determining that the response photo accommodates the desired photo, sending the response photo to the first service subscriber without the starter photo; and
        upon determining that the response photo does not accommodate the desired photo, returning to the act of determining whether a second photo capturing device has a location compatibility for the desired photo.

2. The computing device of claim 1, wherein the first data packet comprises:
    a geolocation from where the desired photo is to be taken;
    a metadata for the desired photo; and
    a time window of when the desired photo is to be provided to the computing device.

3. The computing device of claim 2, wherein the first data packet further comprises supplemental information that further defines a composition of the desired photo.

4. The computing device of claim 2, wherein the second data packet comprises:
    the geolocation from where the desired photo is to be taken;
    the metadata for the desired photo; and
    the time window of when the desired photo is to be provided to the computing device.

5. The computing device of claim 2, wherein the execution of the fulfillment engine application further configures the computing device to perform acts comprising, upon determining that a second photo capturing device has the location compatibility but not the hardware compatibility:
    altering the metadata for the desired photo to accommodate the hardware of the photo capturing device; and
    sending another fulfillment request including the altered metadata in a third data packet to the photo capturing device.

6. The computing device of claim 2, wherein determining whether a second photo capturing device has a location compatibility for the desired photo comprises:
    upon determining that the second photo capturing device is in a first region that includes the geolocation, identifying the second photo capturing device to have the location compatibility; and
    upon determining that the second photo capturing device is in not in the first region but in a second region that is larger than the first region and includes the first region, identifying the second photo capturing device to have the location compatibility.

7. The computing device of claim 2, wherein determining whether a second photo capturing device has a location compatibility for the desired photo comprises:
    upon determining that the second photo capturing device is scheduled to be in a first region that includes the geolocation, identifying the second photo capturing device to have the location compatibility; and
    upon determining that the second photo capturing device is not scheduled to be in the first region but in a second region that is larger than the first region and includes the first region, identifying the second photo capturing device to have the location compatibility.

8. The computing device of claim 2, wherein the metadata is in Exchangeable Photo File Format (EXIF).

9. A non-transitory computer readable storage medium tangibly embodying a computer readable program code having computer readable instructions which, when executed, causes a computer device to carry out the steps of a method for fulfilling a request for a photo, the method comprising:

receiving a request, in a first data packet from a photo capturing device of a first service subscriber, the data packet comprising a starter photo of a subject of a desired photo;

determining whether a second photo capturing device has a location compatibility for the desired photo;

determining whether the second photo capturing device has a hardware compatibility for the desired photo;

upon determining that the second photo capturing device has the location compatibility and the hardware compatibility:

sending a fulfillment request in a second data packet comprising the starter photo to the second photo capturing device;

upon receiving a response photo from the second photo capturing device:

determining whether the response photo accommodates the desired photo;

upon determining that the response photo accommodates the desired photo, sending the response photo to the first service subscriber without the starter photo; and upon determining that the response photo does not accommodate the desired photo, returning to the act of determining whether a second photo capturing device has a location compatibility for the desired photo.

10. The non-transitory computer readable storage medium of claim 9, wherein the first data packet comprises:
a geolocation from where the desired photo is to be taken;
a metadata for the desired photo; and
a time window of when the desired photo is to be provided to the computing device.

11. The non-transitory computer readable storage medium of claim 10, wherein the first data packet further comprises supplemental information that further defines a composition of the desired photo.

12. The non-transitory computer readable storage medium of claim 10, wherein the second data packet comprises:
the geolocation from where the desired photo is to be taken;
the metadata for the desired photo; and
the time window of when the desired photo is to be provided to the computing device.

13. The non-transitory computer readable storage medium of claim 10, the method further comprising, upon determining that a second photo capturing device has the location compatibility but not the hardware compatibility:
altering the metadata for the desired photo to accommodate the hardware of the photo capturing device; and
sending another fulfillment request including the altered metadata in a third data packet to the photo capturing device.

14. The non-transitory computer readable storage medium of claim 10, wherein determining whether a second photo capturing device has a location compatibility for the desired photo comprises:

upon determining that the second photo capturing device is in a first region that includes the geolocation, identifying the second photo capturing device to have the location compatibility; and upon determining that the second photo capturing device is in not in the first region but in a second region that is larger than the first region and includes the first region, identifying the second photo capturing device to have the location compatibility.

15. The non-transitory computer readable storage medium of claim 10, wherein determining whether a second photo capturing device has a location compatibility for the desired photo comprises:

upon determining that the second photo capturing device is scheduled to be in a first region that includes the geolocation, identifying the second photo capturing device to have the location compatibility; and upon determining that the second photo capturing device is not scheduled to be in the first region but in a second region that is larger than the first region and includes the first region, identifying the second photo capturing device to have the location compatibility.

16. The non-transitory computer readable storage medium of claim 10, wherein the metadata is in Exchangeable Photo File Format (EXIF).

17. A method for fulfilling an electronic request for a photo, the method comprising:

receiving a request, in a first data packet from a photo capturing device of a first service subscriber, the data packet comprising a starter photo of a subject of a desired photo;

determining whether a second photo capturing device has a location compatibility for the desired photo;

determining whether the second photo capturing device has a hardware compatibility for the desired photo;

upon determining that the second photo capturing device has the location compatibility and the hardware compatibility:

sending a fulfillment request in a second data packet comprising the starter photo to the second photo capturing device;

upon receiving a response photo from the second photo capturing device:

determining whether the response photo accommodates the desired photo;

upon determining that the response photo accommodates the desired photo, sending the response photo to the first service subscriber without the starter photo; and upon determining that the response photo does not accommodate the desired photo, returning to the act of determining whether a second photo capturing device has a location compatibility for the desired photo.

18. The method of claim 17, wherein the first data packet comprises:
a geolocation from where the desired photo is to be taken;
a metadata for the desired photo; and
a time window of when the desired photo is to be provided to the computing device.

* * * * *